(12) United States Patent
Deruelle

(10) Patent No.: US 8,769,109 B2
(45) Date of Patent: Jul. 1, 2014

(54) JRUBY AND SIP SERVLETS INTEGRATION

(75) Inventor: Jean Deruelle, Dechy (FR)

(73) Assignee: Red Hat, Inc., Raleigh, NC (US)

( * ) Notice: Subject to any disclaimer, the term of this patent is extended or adjusted under 35 U.S.C. 154(b) by 604 days.

(21) Appl. No.: 12/750,307

(22) Filed: Mar. 30, 2010

(65) Prior Publication Data
US 2011/0246979 A1     Oct. 6, 2011

(51) Int. Cl.
G06F 15/16 (2006.01)
H04L 29/12 (2006.01)

(52) U.S. Cl.
CPC .................................. *H04L 61/1529* (2013.01)
USPC ............................ 709/227; 709/230; 709/231

(58) Field of Classification Search
USPC .......................................... 709/227, 230–232
See application file for complete search history.

(56) References Cited

U.S. PATENT DOCUMENTS

| | | | | |
|---|---|---|---|---|
| 7,953,877 | B2 * | 5/2011 | Vemula et al. ................. | 709/230 |
| 2009/0187919 | A1 * | 7/2009 | Maes ............................ | 719/313 |
| 2010/0077072 | A1 * | 3/2010 | Guruswamy et al. ......... | 709/224 |
| 2010/0131513 | A1 * | 5/2010 | Lundberg et al. ............. | 707/741 |
| 2010/0208874 | A1 * | 8/2010 | Anupam ..................... | 379/88.22 |
| 2011/0002452 | A1 * | 1/2011 | Van Der Laak et al. . | 379/114.28 |

OTHER PUBLICATIONS

U.S. Appl. No. 12/156,301, filed May 30, 2008, Atanasoff et al.
U.S. Appl. No. 12/395,389, filed Feb. 27, 2009, Deruelle et al.
Deruelle, Jean, "My New Life @Home: JRuby VoIP app on JBoss 5 reloaded . . ."http://jeanderuelle.blogspot.com/2009/04/jruby-voip-app-on-jboss-5-reloaded-look.html , Apr. 3, 2009, 4pgs.

* cited by examiner

*Primary Examiner* — Phuoc Nguyen
(74) *Attorney, Agent, or Firm* — Lowenstein Sandler LLP

(57) ABSTRACT

A mechanism for JRuby and SIP Servlets integration is disclosed. A method of embodiments of the invention includes deploying, by a Session Initiation Protocol (SIP) Servlets application server, a JRuby application to provide Voice over Internet Protocol (VoIP) services, and associating, by the SIP Servlets application server, a deployment file in a Ruby adaptation layer of a JAVA EE application server with the JRuby application, the deployment file defining a Session Initiation Protocol (SIP) Servlets application name in a SIP configuration section of the deployment file and a name of a class that handles SIP message.

20 Claims, 4 Drawing Sheets

300

Create a new deployment file in a Ruby adaptation layer of a JAVA EE application server, the new deployment file defining a SIP Servlets application name in a SIP configuration section and a name of a class that will handle SIP messages
310

Deploying a JRuby application in a SIP Servlets application server communicably coupled to the JAVA EE application server, the JRuby application associated with the new deployment file of the Ruby adaptation layer
320

Provide VoIP services via the deployed JRuby application in the SIP Servlets application server
330

JRUBY AND SIP SERVLETS INTEGRATION

TECHNICAL FIELD

The embodiments of the invention relate generally to telecommunications and, more specifically, relate to a mechanism for JRuby and SIP Servlets integration.

BACKGROUND

Java is general purpose, concurrent, class-based, and object-oriented programming language. It is specifically designed to have as few implementation dependencies as possible. It is intended to let application developers "write once, run anywhere". The Java Platform includes a Java Virtual Machine (JVM) which can run byte code. Applications in the Java language are compiled to byte code which is, in turn, interpreted by the JVM. JVM allows a programmer to implement other programming languages on top of the Java Platform, as long as those other languages are able to output byte code. As a result, programming languages other than Java can be run by the JVM. The advantage of having different languages running on the Java Platform is so that the features of those languages can benefit from the huge Java ecosystem, so that the applications of those programming languages can access standard libraries written in Java and vice versa.

One such different programming language is the Ruby programming language. Ruby is a dynamic, interpreted, open-source programming language with a focus on simplicity and productivity. It has an elegant syntax that is natural to read and easy to write. JRuby is the implementation of the Ruby programming language that can run Ruby applications on the JVM. Ruby is a particular advantageous programming language in the field of Voice over Internet Protocol (VoIP). VoIP provides for converged telephony services and other media services (e.g., voice, data, video, etc.) over the web. Ruby allows a programmer to take full advantage of VoIP services because there is no programming stack required in Ruby. With Ruby there is no need to recompile or redeploy as changes to the Ruby source code are taken live, thereby shortening the development lifecycle.

However, Ruby does not provide full control over its ability to provide VoIP services. Presently, there are two frameworks in Ruby for VoIP services. One is the Sipper framework, which is a test framework to test Session Initial Protocol (SIP) and converged Web applications. Unfortunately, the Sipper framework does not allow a programmer to create applications or VoIP services. The other Ruby framework is the Adhersion framework which allows the use of Asterisk (an open-source communication platform that acts as a gateway to bridge SIP to standard telephony networks) to create VoIP services. However, Adhersion is limited to Asterisk only and cannot interact directly with SIP or other protocols, thereby limiting the programmer's ability to create VoIP services.

As a result, the integration of JRuby in a Java environment allowing access to the SIP Servlets specification and other telecommunication specifications, such as JSR 309, would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
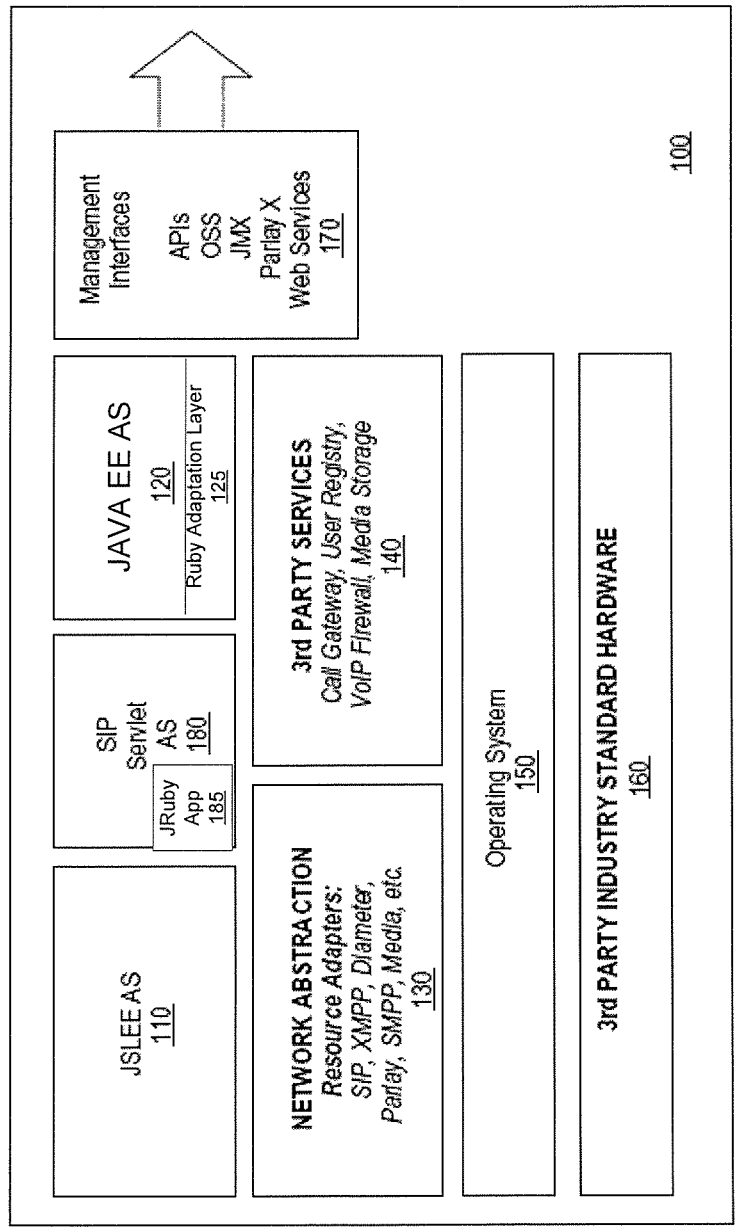
FIG. 1 is a block diagram of a communications platform that integrates JRuby and SIP Servlets according to an embodiment of the invention.

Embodiments of the invention provide a mechanism for JRuby and SIP Servlets integration. A method of embodiments of the invention includes deploying, by a Session Initiation Protocol (SIP) Servlets application server, a JRuby application to provide Voice over Internet Protocol (VoIP) services, and associating, by the SIP Servlets application server, a deployment file in a Ruby adaptation layer of a JAVA EE application server with the JRuby application, the deployment file defining a Session Initiation Protocol (SIP) Servlets application name in a SIP configuration section of the deployment file and a name of a class that handles SIP message.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "deploying", "associating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer.

Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for JRuby and SIP servlets integration. Embodiments of the invention achieve the integration of JRuby and SIP servlets through the use of a new deployment file in the JAVA EE application server that allows JRuby applications to deploy VoIP services. In addition, embodiments of the invention provide a Ruby controller to Ruby applications that mimics the SIP Servlets API for better Ruby integration.

FIG. 1 is a block diagram depicting a communications platform 100 that integrates JRuby and SIP Servlets according to an embodiment of the invention. Communications platform 100 is a single JVM. A JVM is a set of computer software programs and data structures that use a virtual machine model for the execution of other computer programs and servers. Communications platform 100 enables the creation, deployment, and management of services and applications that integrate voice, video, and data. It also functions seamlessly across a range of Internet Protocol (IP) and communications networks, and can be accessed by computers, handsets, and other network-enabled devices.

Communications platform 100 includes an integrated Java Service Logic Execution Environment (JSLEE) Application Server (AS) 110, a SIP Servlet AS 180, and a JAVA EE AS 120. The integrated JSLEE, SIP Servlet, and JAVA EE application servers combine JSLEE and SIP Servlet specifications with JAVA EE to enable the development, deployment and management of applications that integrate voice, video and data across a range of networks and devices.

JSLEE is the JAVA EE for communications, as it is event driven, high throughput, and low latency. On the other hand, SIP Servlets bridge the gap between communications and enterprise systems. SIP Servlets enables web applications to interface with communications networks and devices. SIP Servlets provide a simple programming model by providing a server-side interface describing a container of SIP components or services, to make development of SIP services simple.

The integrated JSLEE 110, SIP Servlets 180, and JAVA EE 120 application servers are a single integrated stack, with JSLEE, SIP Servlets, and JAVA EE running in the same JVM 100. As illustrated, the hierarchy of components supporting the integrated JSLEE AS 110, SIP servlet AS 180, and JAVA EE AS 120 components include a JSLEE network abstraction component 130, third party services 140, operating system 150, and third party industry standard hardware 160. In some embodiments, the application servers 110, 180, 120 may reside on the same machine or on separate machine. Also depicted in FIG. 1 are JSLEE APIs 170 to interface with other outside applications. In one embodiment, the JAVA EE component 110 may be a JBoss™ application server distributed by Red Hat, Inc. of Raleigh, N.C. In another embodiment, the operating system may be Red Hat™ Enterprise Linux system.

In one embodiment, network abstraction component 130 provides a network abstraction layer for the communications platform 100. The network abstraction layer provides connectivity between applications of the communications platform 100 and any network environment, including an IP network or a Legacy network. In this way, application logic is network protocol agnostic so that the application developer is insulated from the underlying network protocol, and thereby simplifies porting between networks. The network abstraction is achieved by the external resources via Resource Adapters (RAs). For example, RAs may include, but are not limited to, Session Initiation Protocol (SIP), Extensible Messaging and Presence Protocol (XMPP), GoogleTalk, Asterisk, Parlay, Diameter, Media, Real-Time Transport Protocol (RTP), Short Message Peer-to-Peer Protocol (SMPP), Intelligent Network Application Part (INAP), HyperText Transport Protocol (HTTP), and Production Rules.

In one embodiment, management interfaces 170 provide third party application programming interfaces (APIs). These third party APIs simplify integrating with core business systems. For example, some of the management functions provided by management interfaces 170 may include, but are not limited to, full visibility for monitoring and management via JMX, internal system APIs (Event Router, Activities, Time Facility), RA APIs, and application APIs (service usage, service building blocks usage, event traffic control). Third party APIs also provide Operational/Business Support Systems (OSS/BSS) connectivity.

The use of the modular JAVA EE architecture with JSLEE and SIP Servlets results in a simple and cleanly separable architecture for the implementation of embodiments of the invention. In one embodiment, the SIP Servlets application server 180 is capable of deploying one or more Ruby applications 185. The Ruby application 185 is programmed in JRuby, the implementation of the Ruby language that allows Ruby applications to run on a JVM. Embodiments of the invention enable Ruby applications 185 to be deployed by the SIP Servlets application server 180 by introducing a new deployment file in a Ruby adaptation layer 125 of the JAVA EE application server 120.

In one embodiment, the Ruby adaptation layer 125 of the JAVA EE application server 120 is a TorqueBox™ distribution. The Ruby adaptation layer 125 is built on top of the JAVA EE application server 120 to allow JRuby applications to be deployed into the JAVA EE application server 120 and it exposes enterprise-grade services (e.g., web services, JMS, etc.) to Ruby applications.

In one embodiment, the new deployment file is a yaml file that includes specifics on how to deploy Voice over Internet Protocol (VoIP) services. The SIP configuration section of the deployment file allows a programmer to define the application name of the SIP Servlets application and the name of the class that will handle the SIP messages.

One examples of a complete*rails.yml deployment descriptor is as follows:
application:
    RAILS_ROOT: /path/to/myappp
    RAILS_ENV: development
web:
    host: www.mycorp.com
    context: /app-one
sip:
    rubycontroller: SipHandler Some embodiments of the invention may provide a Ruby controller to Ruby applications 185 in order to mimic the SIP Servlets API for better Ruby integration. To be able to initiate phone call setup from a Ruby or Rails web controller nothing specific has to be done, except for leveraging the fact that the Ruby adaptation layer 125 provides the HTTP servlet factory. However, in order to be able to receive SIP Messages in a Ruby or Rails application 185, each Telco class must descend, at some point, from Ruby adaptation Layer::Sip::Base, which is a class provided by SIP Servlets to the Ruby adaptation layer 125 to be able to handle SIP Messages the same way it is done through SIP Servlets in JAVA. Because the Ruby adaptation layer 125 allows a programmer to load third-party dependencies, it will also allow a JRuby/SIP Servlets application 185 to include media and other protocols as well, thereby allowing the Ruby application 185 to interact directly with a variety of different Telco protocols.

When the application gets deployed into the SIP Servlets application server 180, the SIP Servlets application server 180 can then determine if the application is a Ruby application or not, thereby allowing the SIP Servlets application server 180 to handle over to the Ruby controller all incoming SIP Messages targeted to it correctly. The same applies to SIP Messages generated and sent by the Ruby application.

Embodiments of the invention allow a Ruby application to benefit from the SIP Servlets API, which gives full control over SIP to developers to create VoIP Services. Furthermore, embodiments of the invention allow for the integration of Ruby applications with other protocols such as Diameter for Billing, Media protocols (to control any kind of Media Server), and any other new protocol that may arise in the future that is JAVA compatible. Lastly, embodiments of the invention allow a Ruby application to benefit from the SIP Servlets and JAVA EE integration to allow for high availability services via redundancy and failover and the use of enterprise services such as Web Services, REST, JMS, and so on directly from Ruby. On the other hand, the advantage of creating VoIP services in Ruby compared to JAVA, is that there is no need to recompile and/or redeploy code because changes to the Ruby source code are taken live, thereby improving and accelerating the development cycle.

Figure 2:
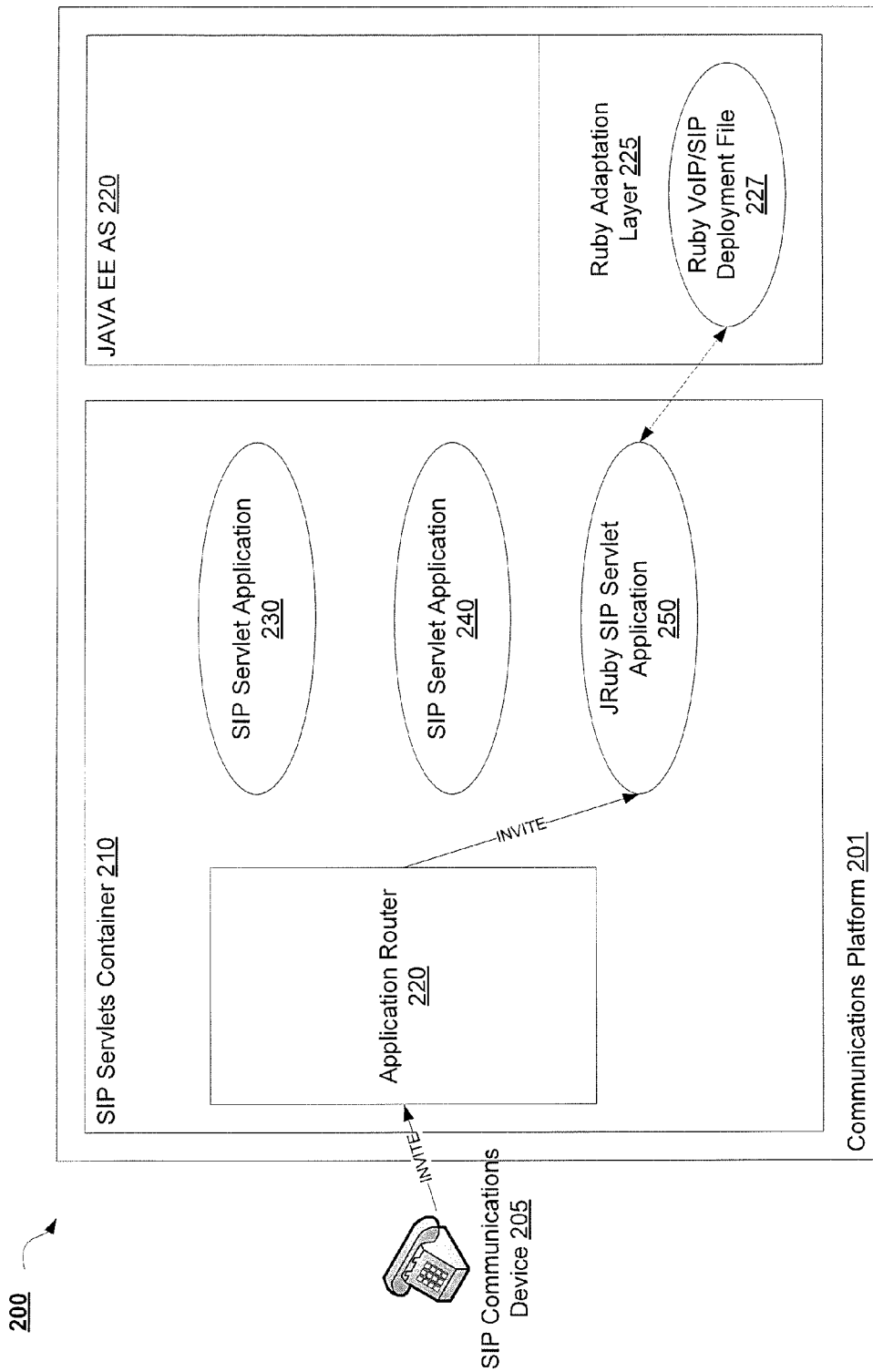
FIG. 2 is a block diagram of a communications system with the integration of JRuby and SIP Servlets according to an embodiment of the invention.

FIG. 2 is a block diagram illustrating a communications system 200 with the integration of JRuby and SIP Servlets according to an embodiment of the invention. In one embodiment, communications system 200 includes a communications platform 201 communicably coupled to a SIP communications device 205. In one embodiment, communication platform 201 is the same as communications platform 100 of FIG. 1. In some embodiments, SIP communications device 205 may include a telephone (as depicted), a fax device, a cell phone, a Global Positioning System (GPS) device, a computer, a modem, and/or any other device capable of sending communication signals. SIP communications device 205 may be communicably coupled to communications platform 201 directly or indirectly via a network. In one embodiment, communications platform 201 includes a communications port (not shown) to receive signals directly or indirectly (e.g., via a network) from SIP communications device 205.

In some embodiments, communications platform 201 may be implemented on a single computer or multiple computers. In other embodiments, communications platform 201 may be implemented on one or more servers. Communications platform 201 includes a SIP Servlets container 210. In one embodiment, SIP Servlets container 210 is the same as Sip Servlets application server 120 described with respect to FIG. 1. The SIP Servlets container 210 may include an application router 220 and one or more SIP Servlets applications 230, 240, 250. The application router 220 is a router that decides which application should be invoked based on an arbitrary number of parameters and the initial request.

In one embodiment, the SIP Servlets container 210 may deploy a JRuby™ SIP Servlet application 250. The deployment of this JRuby™ application 250 is enabled through a deployment file 227 of a Ruby™ adaptation layer 225 of a JAVA EE application server 220 of communications platform 201.

In one example embodiment, the JRuby™ Sip Servlets application 250 may operate as follows. The SIP communications device 205 sends an INVITE to start a call to the SIP Servlets container. An application router 200 decides to route the INVITE to the JRuby SIP Servlets application 250 based on the parameters of the initial request. The JRuby™ SIP Servlets application 250 handles the INVITE as if it were a regular JAVA SIP Servlets application. In some embodiments, the JRuby™ application 250 can also initiate requests on its own or be a converged HTTP/SIP application as well.

Figure 3:
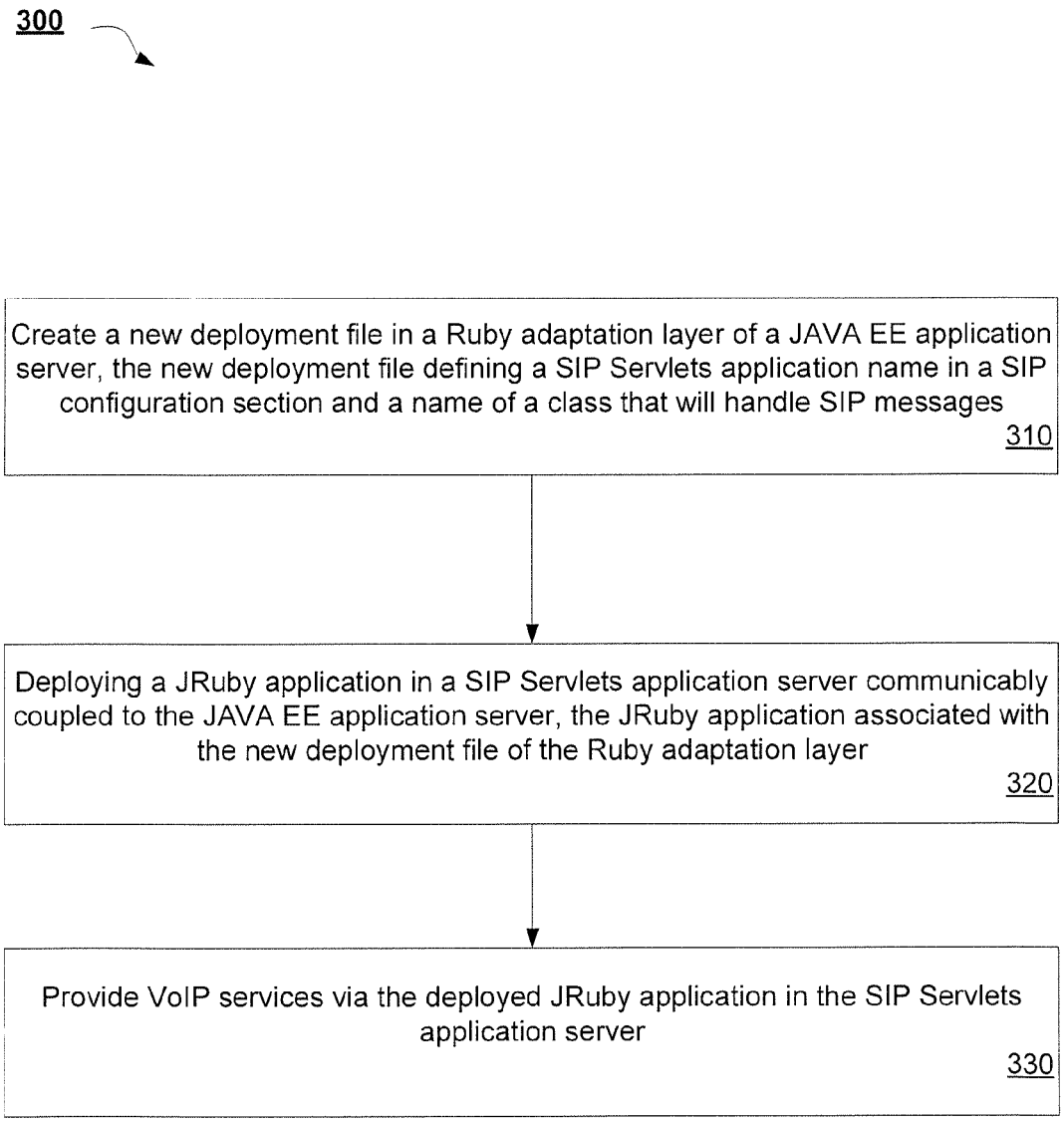
FIG. 3 is a flow diagram illustrating a method for JRuby and SIP Servlets integration according to an embodiment of the invention.

FIG. 3 is a flow diagram illustrating a method 300 for JRuby and SIP Servlets integration according to an embodiment of the invention. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by communications platform 100 described with respect to FIG. 1.

Method 300 begins at block 310 where a new deployment file in a Ruby adaptation layer of a JAVA EE application server is created. The new deployment file may be manually created by a user or automatically created by a tool generating the file and deployed in the application server. In one embodiment, the new deployment file defines a SIP Servlets application name in a SIP configuration section and, if not present, will take the name of the new deployment file minus the -rails.yml suffix and also a name of a class that will handle SIP messages for that application. Then, at block 320, a JRuby application is deployed in a SIP Servlets application server that is communicably coupled to the JAVA EE application server. In one embodiment, the JRuby application may be deployed upon its initialization by a user in order to take advantage of its services. The JRuby application is associated with the new deployment file of the Ruby adaptation layer that was created at block 310. In one embodiment, the association is done through the RAILS_ROOT property located in the deployment file that specifies the path where the application is located. Lastly, at block 330, the deployed JRuby application in the SIP Servlets application server provides VoIP services.

Figure 4:
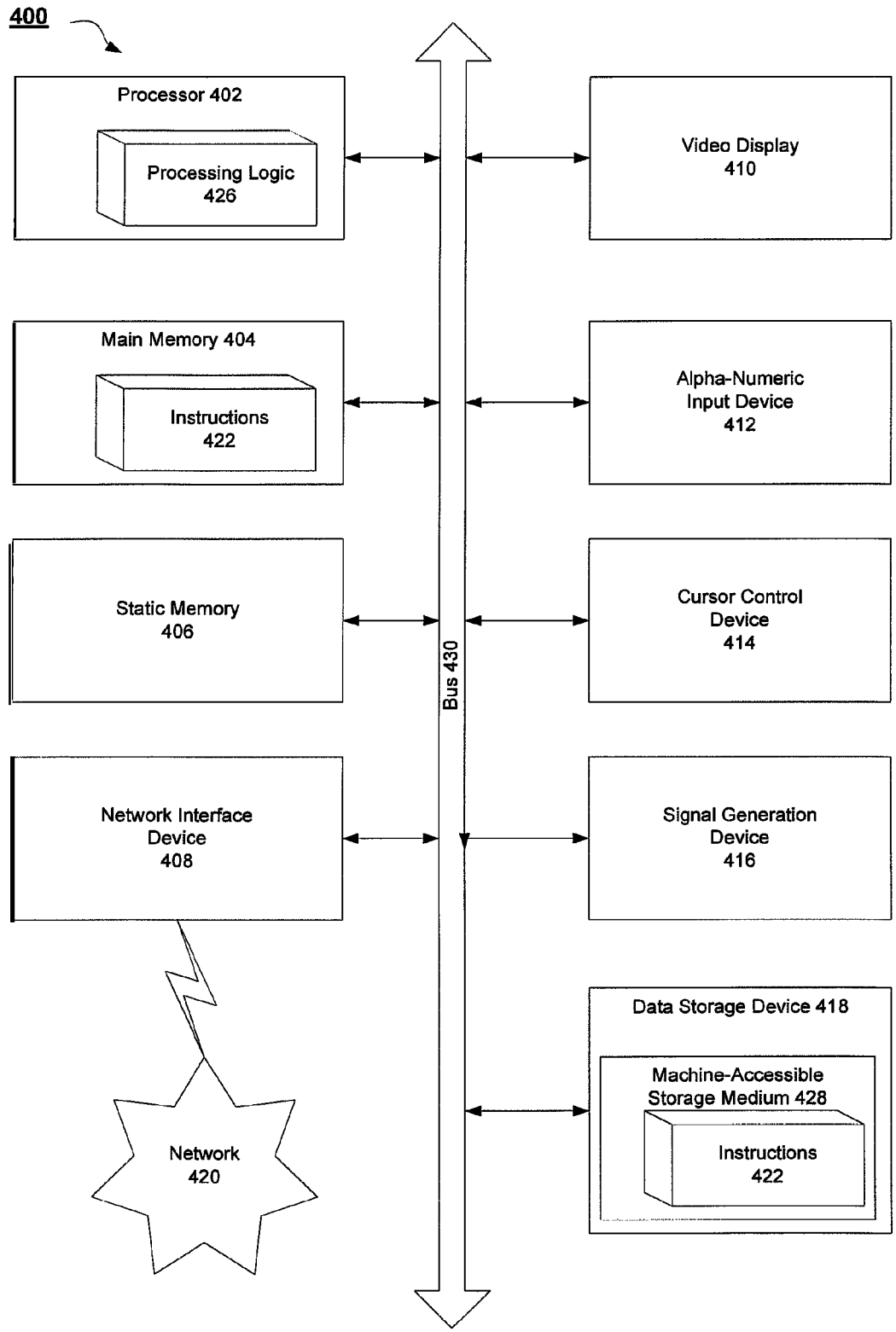
FIG. 4 illustrates a block diagram of one embodiment of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428 on which is stored one or more set of instructions (e.g., software 422) embodying any one or more of the methodologies of functions described herein. For example, software 422 may store instructions to perform JRuby and SIP servlets integration by communications platform 100 described with respect to FIG. 1. The software 422 may also reside, completely or at least partially, within the main memory 404 and/or within the processing device 402 during execution thereof by the computer system 400; the main memory 404 and the processing device 402 also constituting machine-accessible storage media. The software 422 may further be transmitted or received over a network 420 via the network interface device 408.

The machine-readable storage medium 428 may also be used to store instructions to perform method 300 for JRuby and SIP servlets integration described with respect to FIG. 3, and/or a software library containing methods that call the above applications. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
   deploying, by a Session Initiation Protocol (SIP) Servlets application server executed by a processing device, a JRuby™ application to provide Voice over Internet Protocol (VoIP) services, wherein the SIP Servlets application server is integrated with a JAVA Enterprise Edition™ (JAVA EE) application server as a single integrated stack running in a single JAVA virtual machine (JVM); and
   associating, by the SIP Servlets application server, the JRuby™ application deployed in the SIP Servlets application server with the JAVA EE application server, the associating comprising updating a deployment file in a Ruby™ adaptation layer of the JAVA EE application server with a name of the JRuby™ application in a SIP configuration section of the deployment file and a name of a class that handles SIP messages.

2. The method of claim 1, wherein a Ruby™ controller is provided to the JRuby™ application from the Ruby™ adaptation layer in order to mimic a SIP Servlets Application Programming Interface (API).

3. The method of claim 1, wherein the Ruby™ adaptation layer is a TorqueBox™ distribution.

4. The method of claim 1, wherein the JRuby™ application is integrated, via the SIP Servlets application server and the JAVA EE application server, with redundancy and failover services for High Availability.

5. The method of claim 1, wherein the JRuby™ application is integrated, via the SIP Servlets application server and the JAVA EE application server, with Media protocols.

6. The method of claim 1, wherein the JRuby™ application is integrated, via the SIP Servlets application server and the JAVA EE application server, with enterprise services.

7. The method of claim 6, wherein the enterprise services comprise at least one of Web service, Representational State Transfer (REST), or JAVA Messaging Server (JMS).

8. The method of claim 1, wherein the JRuby™ application handles any SIP event in a same manner as a regular JAVA SIP Servlets application.

9. A system, comprising:
a memory;
a processing device;
a communications port communicably coupled to the memory and the processing device, the communications port to receive an event from a communications device;
a media server executable from the memory by the processing device, the media server to initiate media related to the event; and
an integrated application server executable from the memory by the processing device and communicably coupled to the communications port and the media server, the integrated application server comprising a SIP Servlets application server integrated with a JAVA Enterprise Edition™ (JAVA EE) application server as a single integrated stack running in a single JAVA virtual machine (JVM), the SIP Servlets application server to:
deploy a JRuby application to provide Voice over Internet Protocol (VoIP) services; and
associate the JRuby™ application deployed in the SIP Servlets application server with the JAVA EE application server, the associating comprising updating a deployment file in a Ruby™ adaptation layer of the JAVA EE application server with a name of the JRuby™ application in a SIP configuration section of the deployment file and a name of a class that handles SIP messages.

10. The system of claim 9, wherein a Ruby™ controller is provided to the JRuby™ application from the Ruby™ adaptation layer in order to mimic a SIP Servlets Application Programming Interface (API).

11. The system of claim 9, wherein the Ruby™ adaptation layer is a TorqueBox™ distribution.

12. The system of claim 9, wherein the JRuby™ application is integrated, via the SIP Servlets application server and the JAVA EE application server, with redundancy and failover services for High Availability.

13. The system of claim 9, wherein the JRuby™ application is integrated, via the SIP Servlets application server and the JAVA EE application server, with at least one of Media protocols or enterprise services.

14. The system of claim 13, wherein the enterprise services comprise at least one of Web service, Representational State Transfer (REST), or JAVA Messaging Server (JMS).

15. The system of claim 9, wherein the JRuby™ application handles any SIP event in a same manner as a regular JAVA SIP Servlets application.

16. A non-transitory machine-readable storage medium including instructions that, when accessed by a processing device, cause the processing device to perform operations comprising:
deploying, by a Session Initiation Protocol (SIP) Servlets application server executed by the processing device, a JRuby™ application to provide Voice over Internet Protocol (VoIP) services, wherein the SIP Servlets application server is integrated with a JAVA Enterprise Edition™ (JAVA EE) application server as a single integrated stack running in a single JAVA virtual machine (JVM); and
associating, by the SIP Servlets application server, the JRuby™ application deployed in the SIP Servlets application server with the JAVA EE application server, the associating comprising updating a deployment file in a Ruby™ adaptation layer of the JAVA EE application server with a name of the JRuby™ application in a SIP configuration section of the deployment file and a name of a class that handles SIP messages.

17. The non-transitory machine-readable storage medium of claim 16, wherein a Ruby™ controller is provided to the JRuby™ application from the Ruby™ adaptation layer in order to mimic a SIP Servlets Application Programming Interface (API).

18. The non-transitory machine-readable storage medium of claim 16, wherein the Ruby™ adaptation layer is a TorqueBox™ distribution.

19. The non-transitory machine-readable storage medium of claim 16, wherein the JRuby™ application is integrated, via the SIP Servlets application server and the JAVA EE application server, with redundancy and failover services for High Availability.

20. The non-transitory machine-readable storage medium of claim 16, wherein the JRuby™ application is integrated, via the SIP Servlets application server and the JAVA EE application server, with at least one of Media protocols or enterprise services.

* * * * *